Aug. 28, 1945.  J. W. RUSSELL  2,383,742
THICKNESS MEASURING DEVICE
Filed Feb. 18, 1943
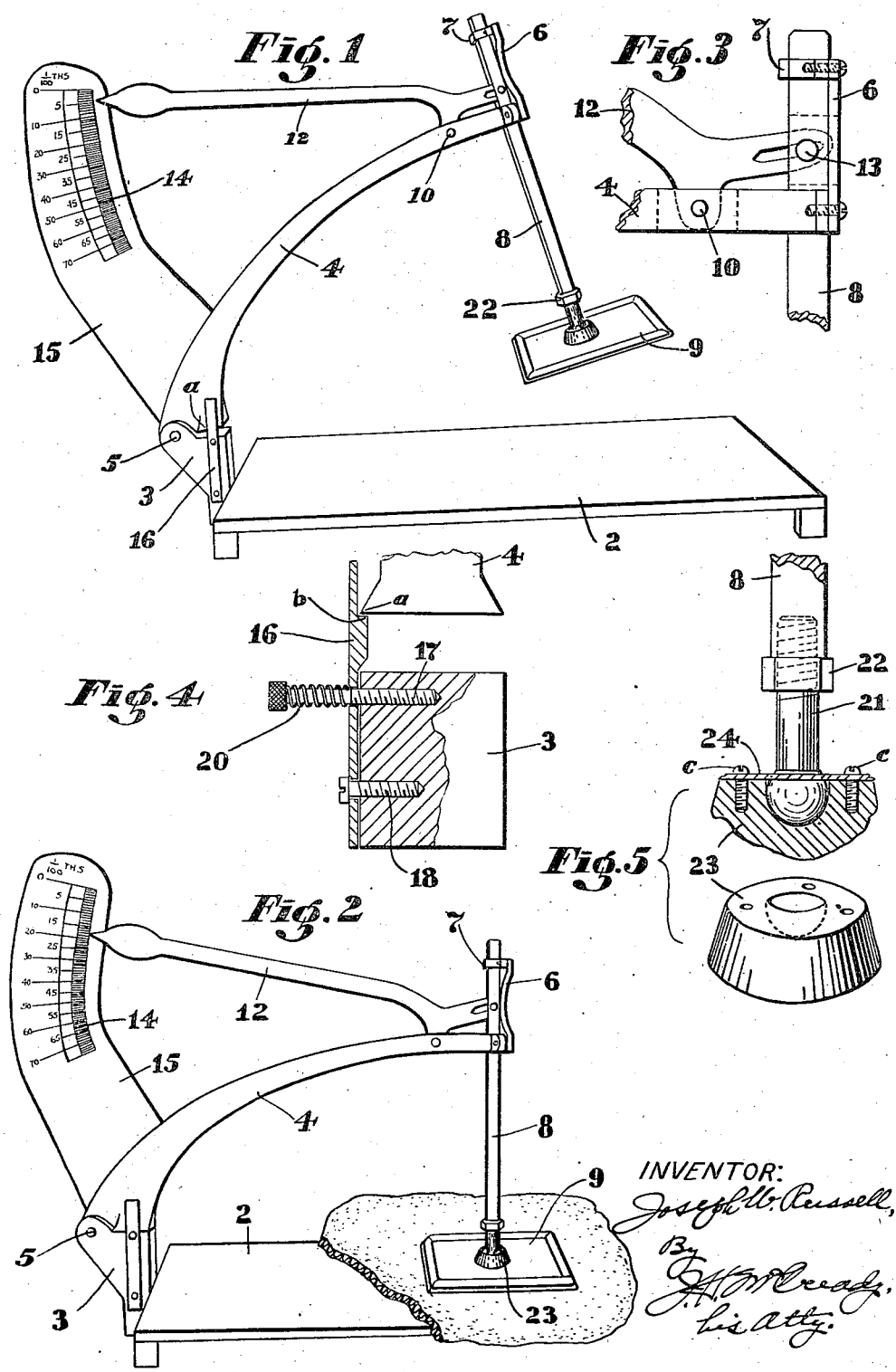

Patented Aug. 28, 1945

2,383,742

UNITED STATES PATENT OFFICE 2,383,742

THICKNESS MEASURING DEVICE

Joseph W. Russell, Nashua, N. H., assignor to Nashua Manufacturing Company, Nashua, N. H., a corporation of New Hampshire Application February 18, 1943, Serial No. 476,305

6 Claims. (Cl. 33—147)

This invention relates to instruments for measuring the thickness of relatively thin materials, such as fabrics, and is more especially concerned with the problem of measuring the thickness of blankets.

The common thickness measuring devices for materials of this character are not satisfactory for use on blankets for the reason that they are capable of operating only on those portions of a blanket at or near its edge, and it is desirable to be able to make these measurements on a blanket at areas remote from the edges. In addition, the work contacting surfaces of the common forms of thickness measuring devices are not suited to operation on blankets or other heavy napped fabrics because the pile or nap of the fabric is compressed to varying degrees by different individuals making such measurements and the results which they obtain vary correspondingly.

The present invention is especially concerned with the problem presented by these considerations and it aims to devise a thoroughly practical solution for that problem.

The nature of the invention will be readily understood from the following description when read in connection with the accompanying drawing, and the novel features will be particularly pointed out in the appended claims.

In the drawing,

Fig. 1 is a perspective view of an instrument constructed in accordance with this invention, illustrating it in its inactive or non-measuring position;

Fig. 2 is a view similar to Fig. 1 but showing the instrument in operation;

Fig. 3 is a side view, on a larger scale, illustrating certain details of construction;

Fig. 4 is a side view, partly in cross-section, showing details of a latch for holding the arm of the instrument in an inactive position; and Fig. 5 is a view, partly in side elevation and partly in section, illustrating additional details of construction.

The device shown in the drawing comprises a base or platform 2 on which the material to be measured is supported. At one end of this base a pivot block 3 is secured thereto and it supports an arm 4 for swinging movement around the pivot pin 5. This arm, together with a guide piece 6 rigidly secured to its outer end and a U-shaped guide member 7 screwed to the upper end of the part 6 (all of which parts may be regarded as a part of the arm) form a support for a plunger which includes a bar 8 and a plate or foot 9 that rests on the blanket during the measuring operation. Fulcrumed at 10 on the arm 4 near its outer end is a pointer 12, one end of which is also pivotally connected at 13 with the plunger 8, while its opposite end is positioned to swing across a scale 14 on a plate 15 which is made integral with, or is rigidly secured to, the arm 4.

It will be observed that the arm 4 reaches forward from its supporting point to a very substantial distance over the base 2, and in order to facilitate the introduction of the blanket in the device for the measurement of its thickness at practically any point in its area, the arm and those parts supported thereon may be swung upwardly and rearwardly around the pivot 5 and away from the base 2 where they will not interfere materially with the disposition and handling of the blanket material. It is desirable, also, to be able to lock the arm in this position, and for this purpose a latch 16 is fastened rather loosely to one side of the block 3 by means of upper and lower screws 17 and 18, respectively. The holes through which these screws extend are somewhat over-size to permit a substantial degree of freedom of movement of the latch relatively to them, and the upper screw is encircled by a coiled spring 20, Fig. 4, which serves to press the latch inwardly where, when the arm 4 is lifted, a bevelled edge portion a, Fig. 4, of it will snap over a flat shoulder b with which the latch is provided, the latter serving to hold the arm in its elevated position. When it is desired to release the arm the latch is pulled back far enough to release the part a.

The plate 9 is fastened to the bar 8 by means of a ball-ended bolt 21, Fig. 5, which is threaded into the lower end of the bar 8 and is locked in its adjusted position therein by a check nut 22. The ball end of this bolt rests in a socket formed for it in a fitting 23 which is either cast integral with the plate 9 or is secured rigidly thereto, and it is held in this socket by a plate 24.

In setting up the device the whole instrument is mounted on a table or some similar support, the plate 9 is brought down on to the base 2, and if it does not rest flatly on the base, then the screws c, Fig. 5, which lock the ball in the part 23, are loosened sufficiently to make it come down flat, after which they are tightened up. Also, in connection with this operation, and before the ball is clamped securely, the check nut 22 is loosened and the bolt 21 is turned in one direction or the other, as may be found necessary, in order to change the length of this part of the plunger sufficiently to make the pointer 12 register with the zero mark on the scale 14. The screws c and the check nut then are tightened up and the instrument is ready for use.

In operation the workman raises the arm into its locked position, as shown in Fig. 1, arranges the fabric so that the desired portion of it is in measuring position, then trips the latch and eases the plunger down on to the work. This is done by gripping the arm 4 and the pointer 12, holding the latter close to the arm while lowering the arm into its normal position; then by releasing the pointer 12 the foot or plate 9 is eased down on to the fabric. During this movement the arm 4 stops in its operative position, as shown in Fig. 2, this position being determined by the engagement of the meeting faces of the shank of the arm 4 and the bracket 3. These faces are best shown in Figs. 1 and 4, and, as illustrated, in the former figure, they both lie in planes passing through the pivot 5 for the arm. Because the plunger is now raised off the base 2, it swings the pointer 12 downwardly along the scale 14 through an angle depending upon the distance by which the plate is separated by the blanket from the surface of the base, and the scale is so graduated that it registers that distance in hundredths of an inch, the vertical movements of the plunger being greatly multiplied by the pointer.

Preferably the plate is made of aluminum, or some relatively light metal, and the pointer 12 is made of a heavier metal so that it will counterbalance most of the weight of the plunger assembly, the part of the weight not so counterbalanced being predetermined accurately to apply the desired degree of pressure to the goods. Preferably, also, the plate is of substantial dimensions, say five by eight inches, so that it bears on a sizeable area of the fabric. Because the pressure with which the plunger foot bears on the fabric is unaffected by variations in the thickness of successive fabrics, an accurate measurement is obtained.

In addition to making merely measurements of thickness, this instrument also is useful in connection with determining the resilience of a blanket. This determination may conveniently be made by measuring the thickness in the manner above described, then placing weights on the plate 9, where the mass will be evenly distributed, thus compressing the area under the plate. After this state of compression has existed for a predetermined length of time, the weights are removed, the plate is lifted, and after another predetermined interval of time the thickness of the same area is again measured. By dividing the last measurement by the first, a ratio is obtained which is the percentage of recovery of the original thickness. Since such recovery depends upon the resilience of the fabric, this ratio is a measurement of that factor.

It should be observed that during the thickness measuring operation the arm 4 is stationary and it operates simply as a support for the plunger, the pointer, and the scale plate, but it does not move. It supports the plunger for vertical sliding movement at right angles to the platform 2 and this fact, plus the further fact that the ball joint permits the angular adjustment of the face of the foot plate into a parallel relationship to the upper surface of the platform makes it possible to secure a uniform distribution of the pressure of the plate over the entire surface of the fabric in contact with it.

While I have herein shown and described a preferred embodiment of my invention, it will be evident that the invention is susceptible of embodiment in other forms without departing from the spirit or scope thereof.

Having thus described my invention, what I desire to claim as new is:

1. In a thickness measuring device, the combination with a base adapted to support the material to be measured, an arm mounted to swing on a horizontal axis and having a part reaching forward over said base, a plunger supported in the outer end of said arm for vertical movement toward and from said base, a pointer fulcrumed on said arm near its outer end and also pivotally connected at one end with said plunger, a graduated scale over which the other end of said pointer swings, and a latch cooperating with said arm to hold it and the parts mounted thereon in an elevated position when the arm has been swung backwardly around said axis.

2. A device for measuring the thickness of blankets, and the like, comprising the combination of a stationary platform for supporting the material to be measured, a plunger having a foot presenting a large surface to bear on said material, an arm mounted to swing on a horizontal axis, extending forwardly from one end of said platform over the latter and supporting plunger for vertical measuring movement toward and from an area of said support spaced widely from said end, means supporting said arm for swinging movement to carry said plunger away from said area and into an inoperative position where the arm and the plunger are out of the way of the manipulation of the material into position to be measured, a pointer connected with said plunger to be moved thereby, a scale cooperating with said plunger to register varying thicknesses of the material being measured, and a latch cooperating with said arm to hold it and the parts mounted thereon in an elevated position when the arm has been swung backwardly around said axis.

3. A device for measuring the thickness of blankets, and the like, comprising the combination of a stationary platform for supporting the material to be measured, a plunger having a foot presenting a large flat surface to bear on said material, an arm extending forwardly from one end of said platform over the latter and supporting said plunger for vertical measuring movement toward and from an area of said platform spaced widely from said end, means rigid with said platform supporting said arm for swinging movement to carry said plunger away from said area and into an inoperative position where the arm and the plunger are out of the way of the manipulation of the material into position to be measured, a pointer connected with said plunger to be operated by the vertical movements of the latter, a scale cooperating with said plunger to indicate measurements of said movement, said pointer, arm and scale being connected together for bodily swinging movement in unison with the arm into and out of their normal operative positions over said platform, and stop means cooperating with said arm to hold it and said plunger normally in their operative or measuring positions.

4. A device for measuring the thickness of blankets, and the like, comprising the combination of a stationary platform for supporting the material to be measured, a plunger having a foot presenting a large flat surface to bear on said material, an arm supporting said plunger for vertical measuring movement toward and from said platform, a bracket secured to one end of said platform and supporting said arm for pivotal movement upwardly and backwardly into an inoperative position, a stop for arresting the downward movement of said arm and holding it in a stationary position where it supports said foot directly over and in measuring relationship to an area of said platform located remotely from said end, a pointer pivotally connected with both said arm and said plunger whereby the vertical movement of the plunger relatively to said arm will swing the pointer through an angle, the amplitude of which will vary with the thickness of the material interposed between said platform and the plunger foot, a scale mounted on said arm and cooperating with said pointer to indicate the thickness of the material being measured, and means for releasably locking said arm in its inoperative position.

5. A measuring device according to claim 4, in which said plunger includes a bar slidable in the outer end of said arm, and a joint connecting said foot with the lower end of said bar for adjustment lengthwise of the bar.

6. A measuring device according to claim 4, in which the weight of said pointer is so proportioned and positioned with respect to the associated plunger as to counter-balance a substantial part of the weight of the plunger.

JOSEPH W. RUSSELL.